(12) United States Patent
Fischer et al.

(10) Patent No.: US 7,944,077 B2
(45) Date of Patent: May 17, 2011

(54) GENERATOR, NACELLE, AND MOUNTING METHOD OF A NACELLE OF A WIND ENERGY CONVERTER

(75) Inventors: Martin Fischer, Klagenfurt (AT); Michael Schwarz, Klagenfurt (AT); Anton Wolf, Neuhausen (DE)

(73) Assignee: AMSC Windtec GmbH, Klagenfurt (AT)

( * ) Notice: Subject to any disclaimer, the term of this patent is extended or adjusted under 35 U.S.C. 154(b) by 3 days.

(21) Appl. No.: 12/528,140

(22) PCT Filed: Mar. 23, 2009

(86) PCT No.: PCT/EP2009/053359
§ 371 (c)(1),
(2), (4) Date: Oct. 15, 2009

(87) PCT Pub. No.: WO2010/081560
PCT Pub. Date: Jul. 22, 2010

(65) Prior Publication Data
US 2010/0127503 A1 May 27, 2010

Related U.S. Application Data

(60) Provisional application No. 61/144,713, filed on Jan. 14, 2009.

(51) Int. Cl.
F03D 9/00 (2006.01)
H02P 9/04 (2006.01)
(52) U.S. Cl. ......................................................... 290/55
(58) Field of Classification Search .................... 290/55
See application file for complete search history.

(56) References Cited

U.S. PATENT DOCUMENTS

| | | | | |
|---|---|---|---|---|
| 2,397,183 | A | | 3/1946 | Kilgore et al. .................. 416/40 |
| 3,521,091 | A | * | 7/1970 | Halas ............................... 310/10 |
| 3,868,521 | A | * | 2/1975 | Schlicker et al. ............. 310/257 |
| 4,337,406 | A | * | 6/1982 | Binder ............................ 310/91 |
| 4,602,872 | A | * | 7/1986 | Emery et al. ................. 374/152 |
| 4,870,310 | A | * | 9/1989 | Triplett .......................... 310/74 |
| 4,871,923 | A | * | 10/1989 | Scholz et al. .................. 290/55 |
| 5,252,029 | A | * | 10/1993 | Barnes ......................... 416/142 |
| 5,701,044 | A | * | 12/1997 | Emshoff et al. ................ 310/54 |
| 5,755,100 | A | * | 5/1998 | Lamos ............................ 60/521 |
| 5,775,229 | A | * | 7/1998 | Folk et al. ................. 105/157.1 |

(Continued)

FOREIGN PATENT DOCUMENTS

EP 1959548 8/2008

(Continued)

*Primary Examiner* — T. C. Patel
*Assistant Examiner* — Pedro J Cuevas
(74) *Attorney, Agent, or Firm* — Occhiuti Rohlicek & Tsao LLP

(57) ABSTRACT

This invention provides a nacelle of a wind energy converter and a corresponding mounting method of a nacelle of a wind energy converter and a generator for a wind energy converter. The nacelle includes a main frame; a generator including a stator and a rotor; a generator housing attached to the main frame and at least partially enclosing the stator and a rotor space; wherein the generator housing (20; 20') has a first and second side face (S1, S2); wherein the first side face (S1) of the generator housing (20; 20') exposes the rotor space (21); and a flange rotatably supported on the main frame and having a first end which is connected to the rotor; wherein the rotor extends into the rotor space (25) from the first side face (S1) without being supported in the generator housing.

22 Claims, 7 Drawing Sheets

U.S. PATENT DOCUMENTS

Figure 1A:
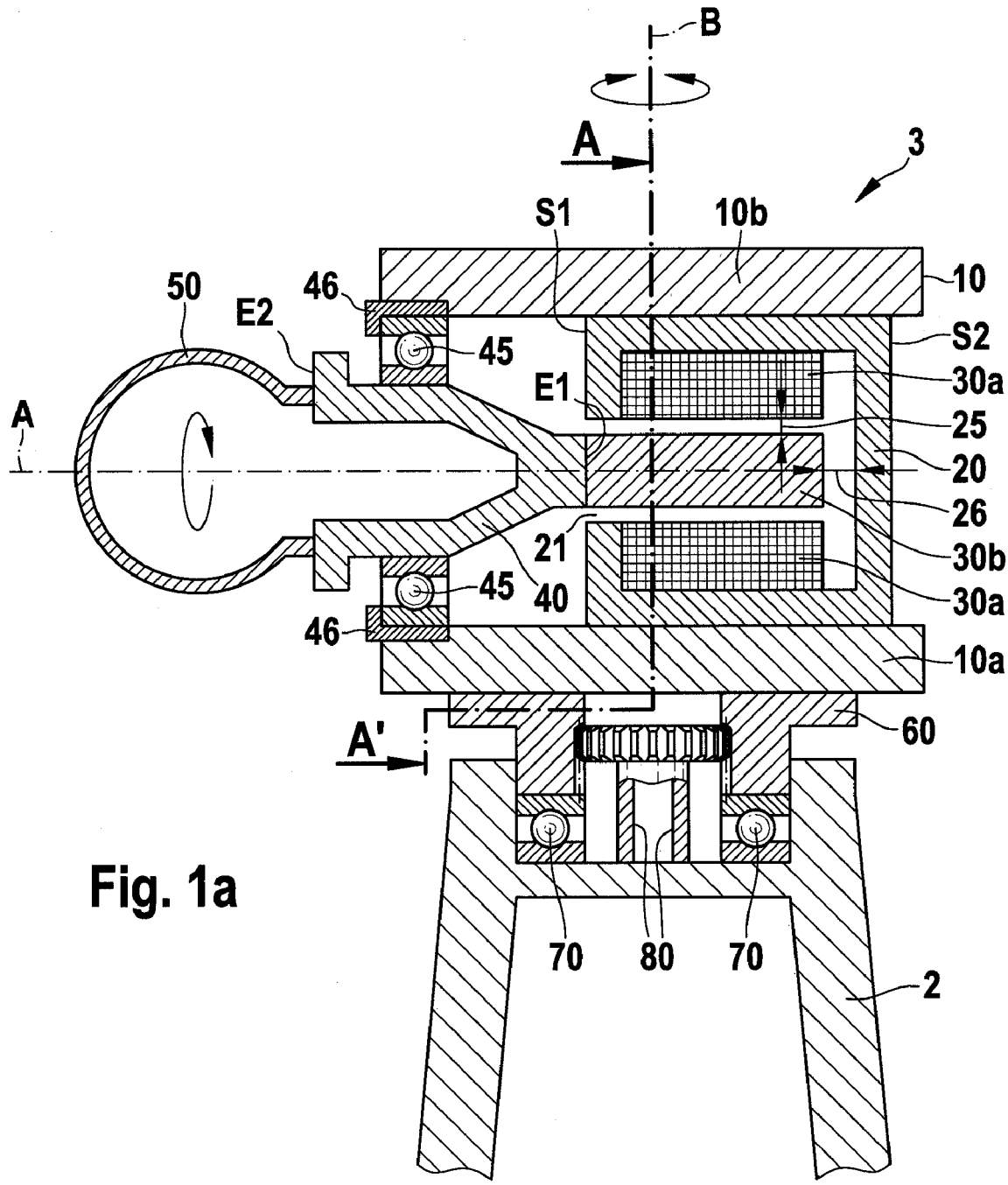

| | | | |
|---|---|---|---|
| 5,952,746 A * | 9/1999 | Mittmann et al. | 310/12.31 |
| 6,459,165 B1 * | 10/2002 | Schoo | 290/1 C |
| 6,750,559 B2 * | 6/2004 | Becker | 290/55 |
| 6,781,276 B1 * | 8/2004 | Stiesdal et al. | 310/254.1 |
| 6,833,632 B2 * | 12/2004 | Becker et al. | 290/55 |
| 6,909,989 B2 * | 6/2005 | Thompson et al. | 702/182 |
| 6,995,544 B2 * | 2/2006 | Sumimoto et al. | 322/25 |
| 7,075,192 B2 * | 7/2006 | Bywaters et al. | 290/55 |
| 7,109,600 B1 * | 9/2006 | Bywaters et al. | 290/55 |
| 7,119,453 B2 * | 10/2006 | Bywaters et al. | 290/55 |
| 7,183,665 B2 * | 2/2007 | Bywaters et al. | 290/55 |
| 7,360,310 B2 * | 4/2008 | Bagepalli et al. | 29/898.08 |
| 7,547,985 B2 * | 6/2009 | Takaichi et al. | 290/55 |
| 7,617,602 B2 * | 11/2009 | Dupin et al. | 29/889.1 |
| 7,642,668 B2 * | 1/2010 | Kim et al. | 290/55 |
| 7,671,496 B2 * | 3/2010 | Groening | 310/75 R |
| 7,736,125 B2 * | 6/2010 | Bagepalli et al. | 415/126 |
| 7,755,230 B2 * | 7/2010 | Nakahara et al. | 310/53 |
| 2004/0041409 A1 | 3/2004 | Gabrys | 290/55 |
| 2007/0041833 A1 * | 2/2007 | Dupin et al. | 415/214.1 |
| 2007/0075548 A1 * | 4/2007 | Bagepalli et al. | 290/55 |
| 2008/0199309 A1 * | 8/2008 | Bagepalli et al. | 415/170.1 |
| 2008/0272602 A1 * | 11/2008 | Kim et al. | 290/55 |
| 2009/0021021 A1 * | 1/2009 | Grenier | 290/55 |
| 2010/0156102 A1 * | 6/2010 | Grenier | 290/44 |
| 2010/0253085 A1 * | 10/2010 | Minowa et al. | 290/55 |
| 2010/0253087 A1 * | 10/2010 | Lauke | 290/55 |
| 2010/0283252 A1 * | 11/2010 | Fradella | 290/55 |

FOREIGN PATENT DOCUMENTS

WO     2004/040740     5/2004

* cited by examiner

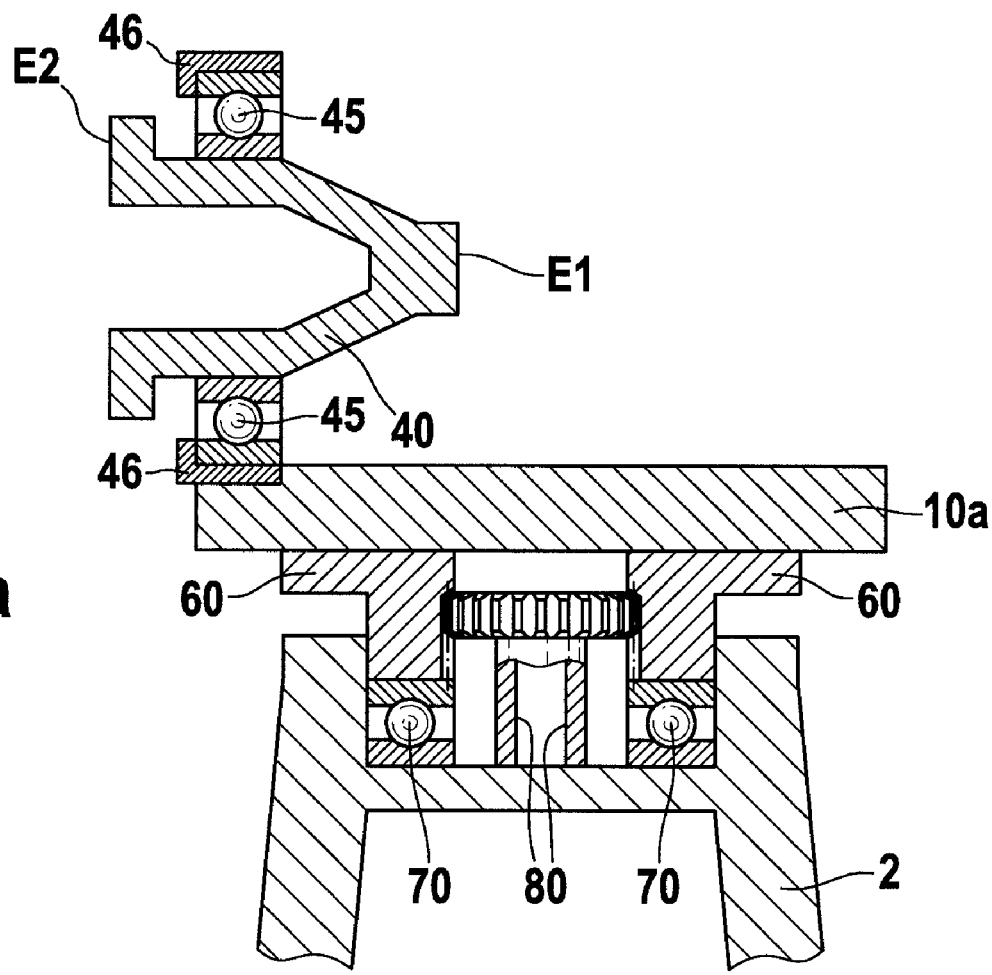

GENERATOR, NACELLE, AND MOUNTING METHOD OF A NACELLE OF A WIND ENERGY CONVERTER

CROSS-REFERENCE TO RELATED APPLICATIONS

This application is the National Stage of International Application No. PCT/EP2009/053359, filed on Mar. 23, 2009, which claims the priority of U.S. Application No. 61/144,713, filed Jan. 14, 2009. The contents of both applications are hereby incorporated by reference in their entirety.

BACKGROUND

The present invention relates to a generator, a nacelle, and a mounting method of a nacelle of a wind energy converter.

A wind energy converter is a rotating machine which converts the kinetic energy in wind into electricity and feeds the electricity into the electrical grid.

A wind energy converter generally includes a nacelle disposed on a tower. The nacelle (also called gondola) includes a rotor head equipped with blades, and a main shaft connected to the rotor head, also called hub, which integrally rotates with the rotor head. Moreover, the nacelle can rotate around a vertical axis so as to actively or passively follow the wind direction.

A first type of nacelle further includes a gear box connected to the main shaft that rotates upon receiving the wind power supplied to the blades, and a generator driven by an output shaft from the gear box. According to the wind energy converter having this structure, the rotor head equipped with the blades converts wind power into a torque, and the main shaft rotates to generate a first rotational speed. The first rotational speed is increased via the gear box connected to the main shaft, and a corresponding second larger rotational speed is transmitted to the rotor of the generator.

A second type of nacelle without gear box uses direct drive turbines with AC generators with variable frequency. Special high power electronics convert from variable frequency to constant frequency in the grid.

In present wind energy converters, the mounting of the preassembled nacelle on the tower using a crane is quite difficult and complex since the single components should be treated with respect. The nacelle can either be completely pre-assembled or can be sequentially mounted on top of the tower divided into plural segments.

The mounting method using divided segments of the nacelle simplifies the transport using the crane; however, it requires further complicated mounting steps on top of the tower.

Since the nacelle components are heavy, typically weighing a total of between 50 and 100 tons, both transport and mounting are generally problematic.

EP 1 921 310 A1 discloses a nacelle of a wind power plant is known that includes a generator and a gear box arranged in series which operate together, wherein a first bearing supports the rotor at the input side of the gear box and a second bearing supports the rotor at the output side of the generator.

For nacelles without a gear box, the rotor is normally supported by a first bearing on the input side of the generator and a second bearing at the output side of the generator.

This is necessary because the air gap between the rotor and the stator of the generator normally ranges between 2 and 6 mm. In other words, the air gap is very small and the input and output bearings are necessary in order to avoid the detrimental influence of mechanical tolerances.

SUMMARY

In a general aspect, a nacelle of a wind energy converter includes a main frame, a generator including a stator and a rotor, and a generator housing attached to the main frame and at least partially enclosing the stator and a rotor space. The generator housing has a first side face which exposes the rotor space. A flange is rotatably supported on the main frame and includes a first end which is connected to the rotor. The rotor extends into the rotor space from the first side face without being supported in the generator housing.

In another aspect, a nacelle of a wind energy converter includes a main frame, a generator including a stator and a rotor, a generator housing attached to the main frame and at least partially enclosing the stator and a rotor space, and a flange rotatably supported on the main frame and including a first end which is connected to the rotor. The rotor extends into the rotor space without being supported in the generator housing.

Embodiments may include one or more of the following. The flange includes a second end which is connected to a hub for attaching rotor blades. The generator housing is of substantially cylindrical shape, e.g., of cylindrical cup shape. The generator housing includes a first side face, the first side face exposing the rotor space. The generator housing includes a second side face opposite to the first side face, the second side face including at least one opening.

The main frame is form-closed with an outer surface of the generator housing. The main frame includes a first part and a second part which are releasably connected with each other and which embrace the generator housing. An air gap between the stator and the rotor is at least 1 cm, e.g., between 1 cm and 5 cm. At least one of the stator and the rotor includes a superconductor.

In a further aspect, a mounting method of a nacelle of a wind energy converter includes the steps of mounting a first part of a main frame on a tower, mounting a rotatably supported flange which includes a first end on the first part of the main frame, providing a generator housing at least partially enclosing a stator and a rotor space, providing spacers in the rotor space, inserting a rotor into the rotor space such that the spacers are positioned between the rotor and the stator, mounting the generator housing including the inserted rotor on the first part of the main frame, connecting the first end of the flange to the rotor, and removing the spacers such that the rotor extends into the rotor space without being supported in the generator housing.

Embodiments may include one or more of the following. A second part of the main frame is mounted such that the first and second parts embrace the generator housing. The flange includes a second end. The method further includes the step of connecting the second end to a hub for attaching rotor blades. The step of mounting the flange includes mounting a bearing supported by a bearing housing on the first part of the main frame.

In another aspect, a generator includes a stator, a rotor, and a generator housing at least partially enclosing the stator and a rotor space. The rotor extends into the rotor space without being supported in the generator housing.

Embodiments may include one or more of the following. The generator housing is of substantially cylindrical shape, e.g., of cylindrical cup shape. The generator housing includes a first side face, the first side face exposing the rotor space.

The generator housing includes a second side face opposite to the first side face, the second side face including at least one opening.

An air gap between the stator and the rotor is at least 1 cm, e.g., between 1 cm and 5 cm. At least one of the stator and the rotor includes a superconductor. A cooling system is provided in the generator housing. A sensor is provided in the generator housing.

With the generator described herein, it is possible to integrate a generator housing in a main frame which contains several components, e.g. generator and stator of the generator, but which does not support the rotor. By integrating this special generator housing in the main frame, the transport and mounting problems of the generator can be drastically reduced.

The generator housing can furthermore include rigidity improvement parts. Depending on the housing rigidity, the mainframe rigidity can be supported or compensated. Generally, the rigidity of the housing is determined by the mainframe. Moreover, improved testability components can be included. The generator housing facilitates the whole generator testing process as there is only a need for a single separate mounted bearing and rotor.

The cylindrical housing can be fully or partially closed/open on the rear side. With this construction, a device can be mounted that allows easy integration of the housing into the mainframe and also easy extraction of the housing from the mainframe.

It is preferred that the housing is a cylindrical housing. If the cylindrical form is chosen for the housing, only torsion forces are transferred into the cylindrical housing.

With an open rear side construction, the generator can be very easily assembled/disassembled in parts; this construction eases the technical maintenance of all integrated components in the housing.

Integrated temperature measuring systems linked to a cooling and heating circuit can be provided which monitor the temperature and depending on the monitored temperature start or stop the integrated cooling or heating circuits.

A generator and a nacelle as described herein provide significant advantages. The generator housing offers protection to integrated sensitive components during transport and mounting. Fixing the generator housing into an already mounted tower and a partially mounted or completely mounted nacelle is much easier than lifting and mounting a completely pre-assembled nacelle.

All these above-mentioned advantages will help to reduce the overall cost in wind turbine manufacturing based on easier transport and assembling, integrated cooling/heating and improved rigidity. The simplified testing conditions also contribute significantly to cost reduction.

Further aspects are illustrated in the accompanying drawings and described in detail in the following part of the description.

FIGURES

Figure 1B:
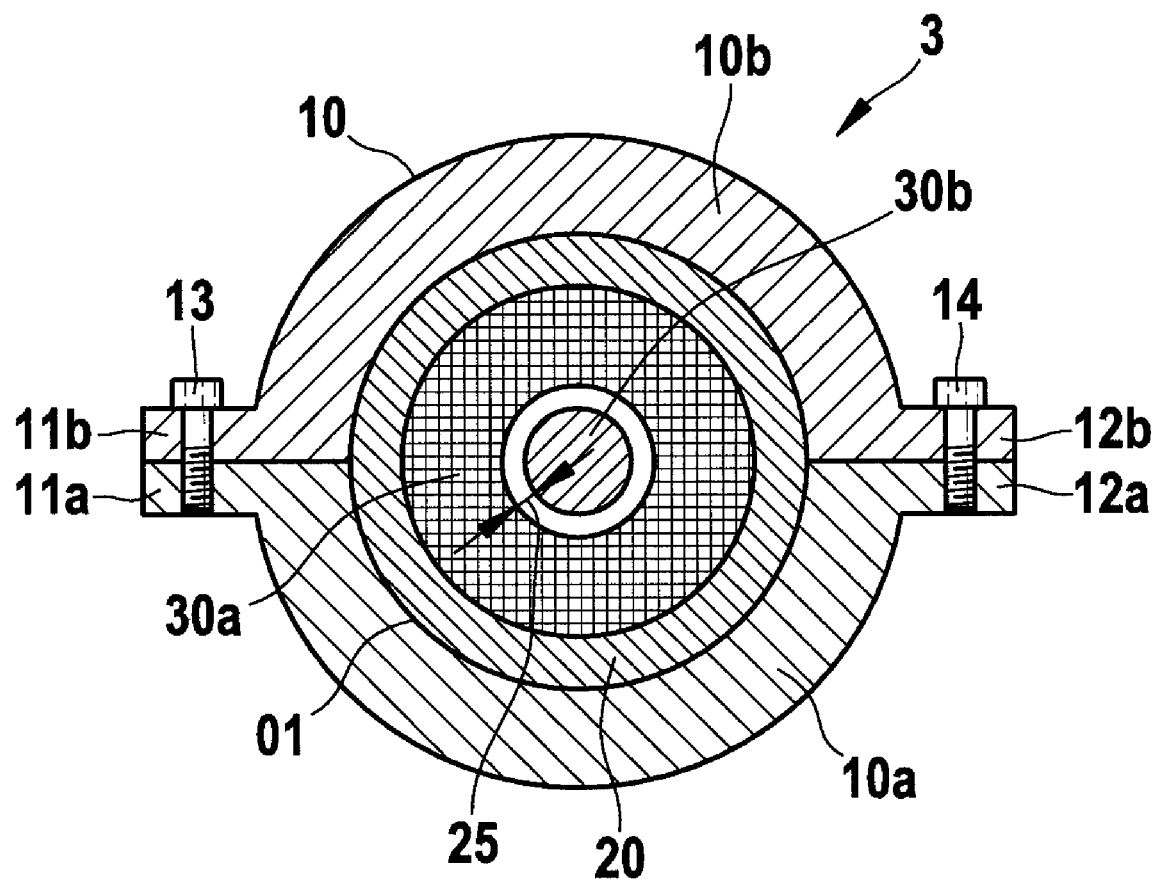
Figure 2A:
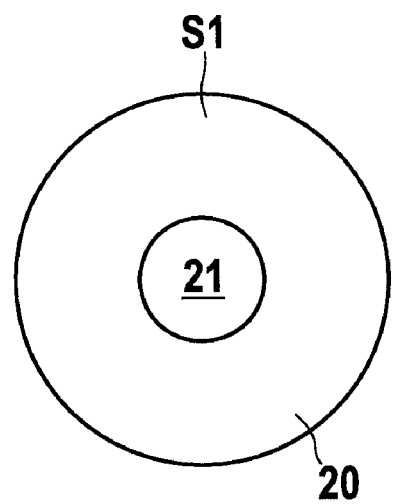
Figure 2B:
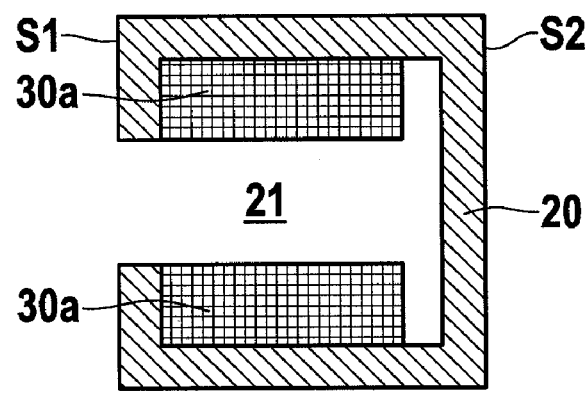
Figure 2C:
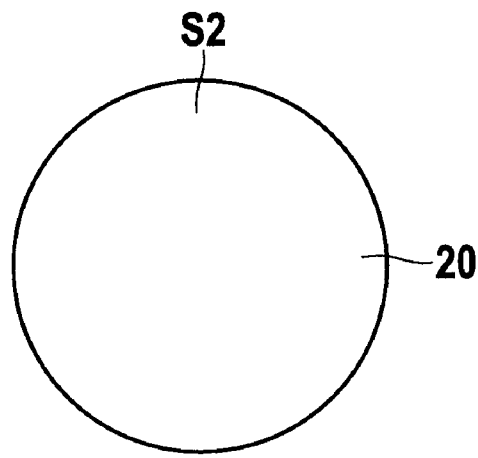
Figure 3A:
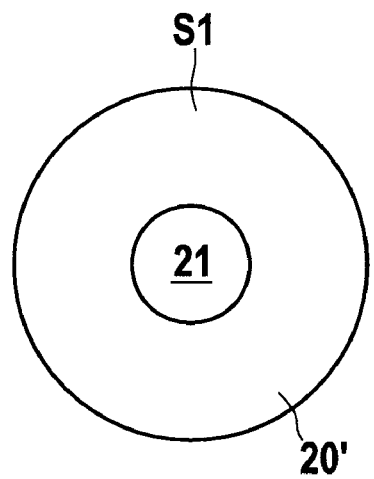
Figure 3B:
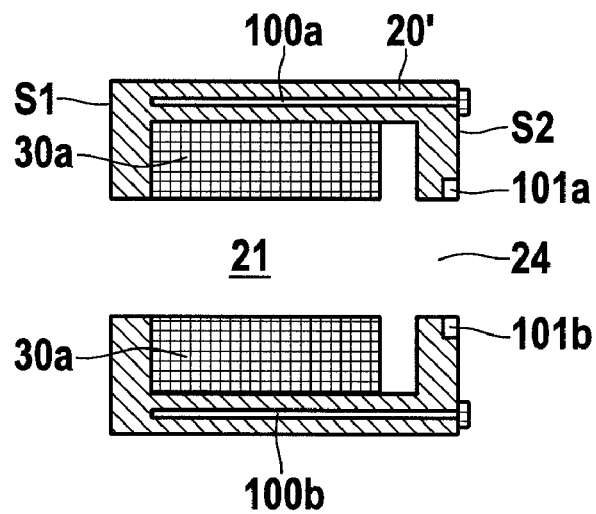
Figure 3C:
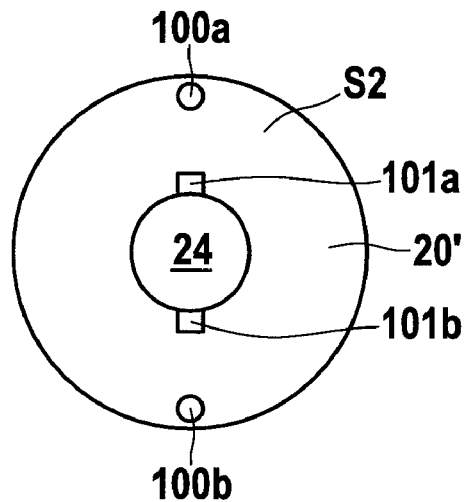
Figure 4B:
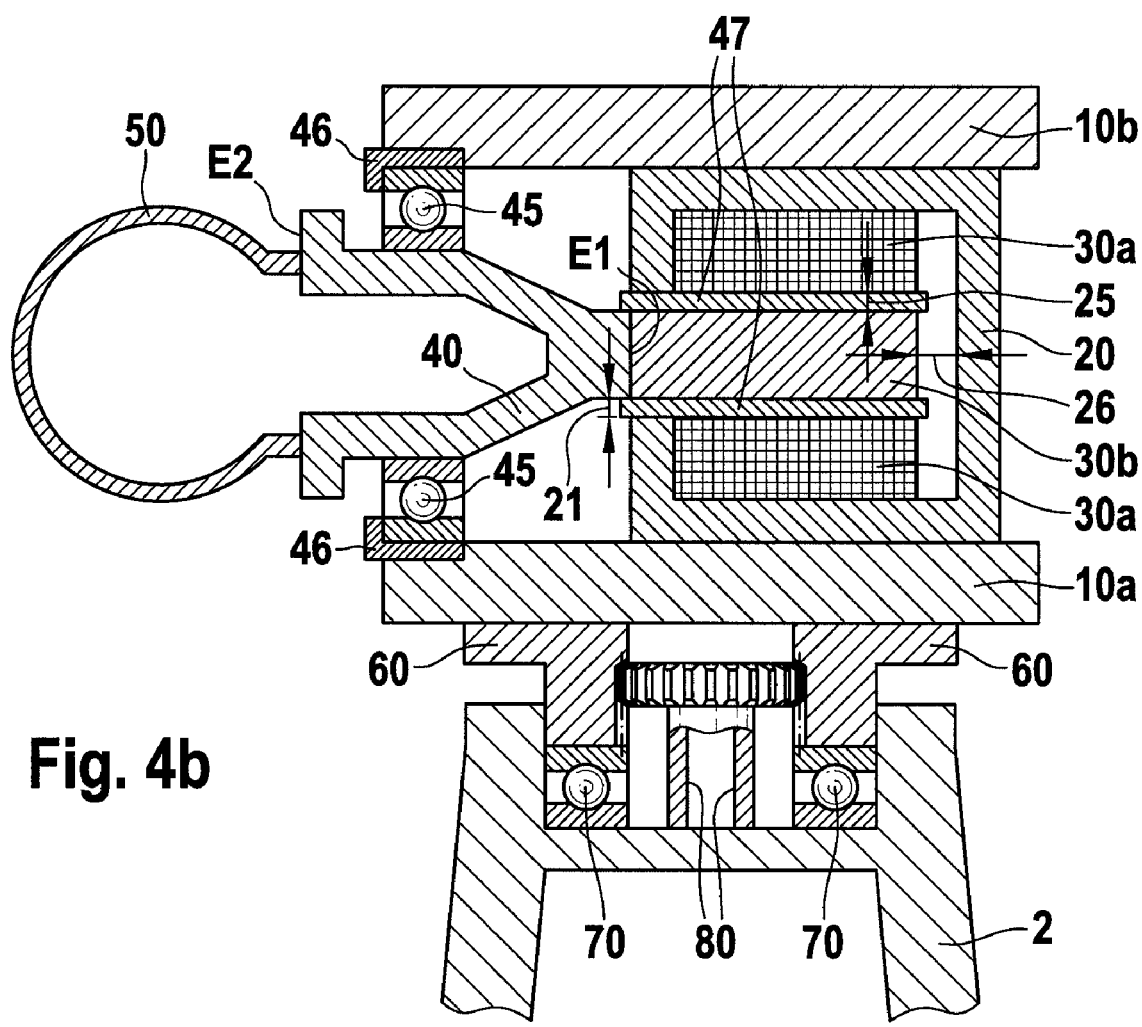
Figure 5:
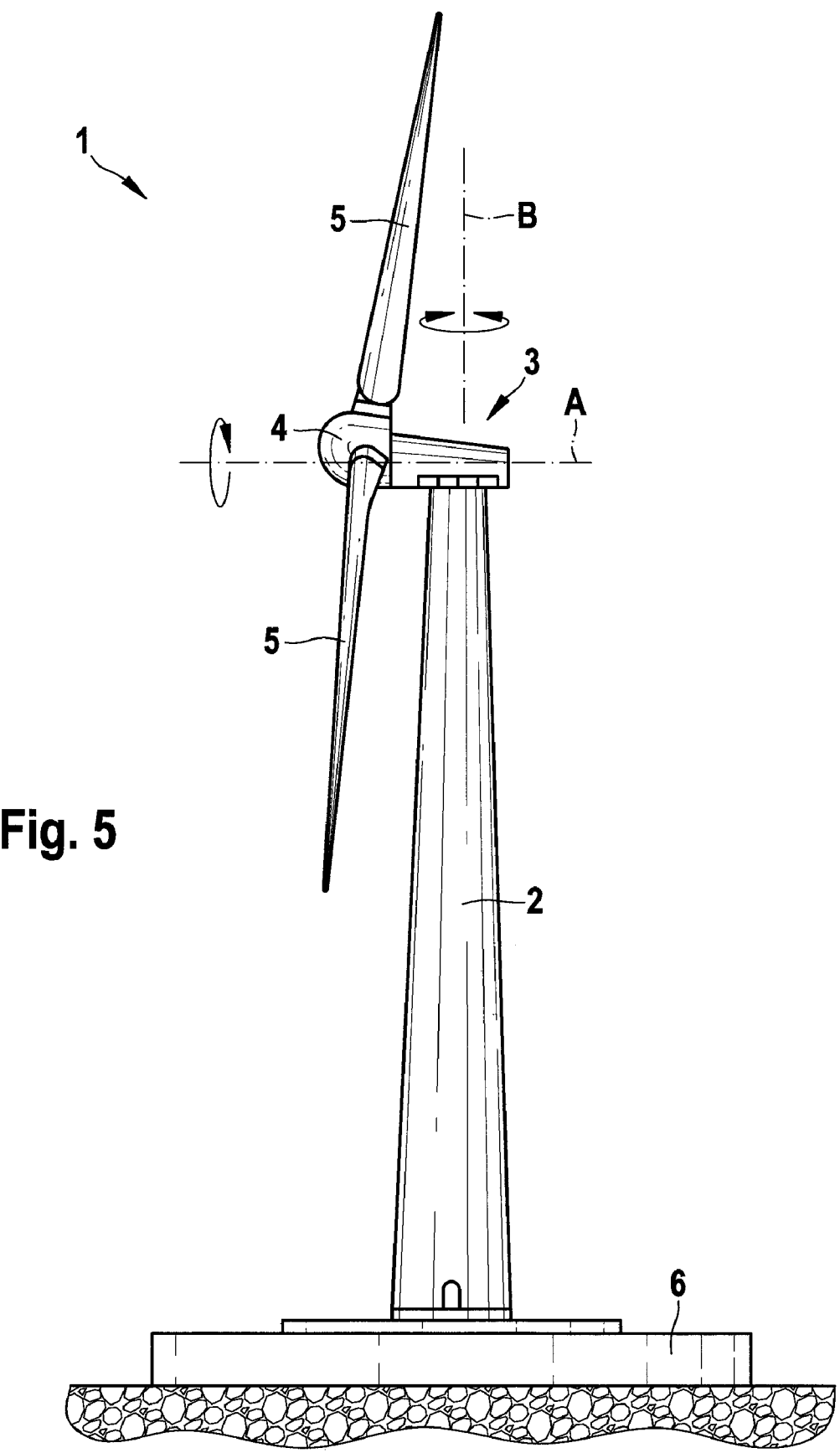

In the Figures:

FIG. 1a,b are cross-sectional views showing an example of the internal structure of one embodiment of a nacelle, wherein FIG. 1a is a longitudinal cross-section along the blade rotational axis A, and FIG. 1b is a transverse cross-section along the nacelle rotational axis B indicated as A-A' in FIG. 1a;

FIGS. 2a-c are different views showing the cylindrical generator housing of FIG. 1a, wherein FIG. 2a is a vertical cross-section along the blade rotational axis A, FIG. 2b is a plain side view of the side S1, and FIG. 2c is a plain side view of the side S2;

FIGS. 3a-c are different views showing another example of a cylindrical generator housing which may be used in the nacelle FIG. 1a, wherein FIG. 3a is a plain side view of the side S1, FIG. 3b is a vertical cross-section along the blade rotational axis A, and FIG. 3c is a plain side view of the side S2;

FIG. 4a,b are cross-sectional views for illustrating a mounting method of the nacelle of FIG. 1a,b; and FIG. 5 is a side view showing an example of the overall structure of a wind energy converter.

Throughout the figures the same reference numbers indicate the same or functionally equivalent means. It should be noted that the individual figures for explaining specific modes of operation do not include all details, but just the details needed for explaining the respective mode.

DETAILED DESCRIPTION

FIG. 5 is a side view showing an example of the overall structure of a wind energy converter. A wind energy converter 1 includes a tower 2 disposed on a foundation 6, a nacelle 3 provided on the upper end of the tower 2 which is rotatable around a substantially vertical axis B, and a rotor head 4 provided on the nacelle 3 including a hub (not shown) for fixing rotor blades 5, which rotor head 4 is rotatable around a substantially horizontal axis A.

A plurality of blades 5 is attached to the rotor head 4 so as to be radially disposed around the rotation axis A. Thereby, wind power supplied to the blades 5 from the direction of the variable rotation axis A of the rotor head 4 is converted into mechanical power for rotating the rotor head 4 around the rotation axis.

FIG. 1a,b are cross-sectional views showing an example of the internal structure of a nacelle, wherein FIG. 1a is a longitudinal cross-section along the blade rotational axis A, and FIG. 1b is a transverse cross-section along the nacelle rotational axis B indicated as A-A' in FIG. 1a.

In FIG. 1a the top of the tower 2 is shown. On the top of the tower 2 a nacelle 3 is mounted.

The nacelle 3 includes a mainframe 10 which has a lower part 10a and an upper part 10b which parts 10a, 10b enclose a cylindrical space (see FIG. 1b) defined by the cylindrical inner surface O1 of the parts 10a, 10b.

The upper part 10b is fixed to the lower part 10a by means of bolts 13, 14 which are mounted in flanges 11a, 12a integrally provided in the lower part 10a and flanges 11b, 12b integrally provided in the upper part 10b. The lower part 10a and the upper part 10b embrace in form-closed manner a cylindrical generator housing 20 which includes a stator 30a and a rotor space 21. It should be mentioned that this generator housing 20 is a pre-assembled part that can be separately mounted between the mainframe parts 10a, 10b, particularly without a rotor 30b.

The cylindrical generator housing 20 has a first side face S1 and a second side face S2. In this example, the second side face S2 is fully closed such that the generator housing 20 exhibits a cylindrical cup-shape.

The first side face S1 is open and exposes the rotor space 21. A cylindrical bearing 45 supported by a bearing housing 46 is mounted between the first and second parts 10a, 10b of the mainframe 10 which bearing 45 rotatably supports a flange 40 which has a first and second end E1, E2 and which exhibits a Y-shaped cross-section along axis A.

The first end E1 of the flange 40 is connected to the rotor 30b which is contactlessly inserted into the rotor space 21 through the first side face S1 of the generator housing 20. In other words, the rotor 30b extends into the rotor space 21 from the first side face S1 without being supported in the generator housing 20 and only supported by the flange 40 which is inserted into the bearing 45. Thus, in contrast to known structures, in this construction only a single bearing 45 outside the generator housing 20 is necessary which reduces the construction complexity and the costs.

An air gap 25 between the rotor 30b and the stator 30a in this example amounts to about 2.5 cm because the stator coils in this example are superconducting coils which are cooled via pipes (not shown) in the generator housing 20. The distal end of the rotor 30b from the flange 40 also exhibits a gap 26 to the second side face S2 of the generator 20 which also typically amounts to several centimeters.

Depending on the mechanical tolerances of the bearing 45 and the other generator components the air gap 25 may be made smaller than 2.5 cm. However, for air gaps 25 below 1 cm it is difficult to realize such an arrangement with a single bearing 45, and a need for a further bearing outside the generator housing 20 may arise. This is also because of deformations at the concrete construction from the loads acting on the rotor head 4, namely wind loads and weight loads.

Furthermore, attached to the second end E2 of the flange 40 is a hub 50 for attaching rotor blades (not shown). The rotor with the flange 40 and the attached hub 50 is rotatable around a horizontal axis A driven by the wind acting on the rotor blades.

Moreover, in this example there is a further flange 60 attached to the bottom part 10a of the mainframe 10 which flange 60 is supported by a bearing 70 provided on the top of the tower 2 so as to make the nacelle 3 rotatable about a vertical axis B in order to be able to follow wind direction actively. This active following of the wind direction is achieved by gear drives 80 which act on the inner periphery of the flange 60 in conventional manner.

It should be mentioned that main frame part 10a and flange 60 could be realized as a single part.

FIGS. 2a-c are different views showing the cylindrical generator housing of FIG. 1a, wherein FIG. 2a is a vertical cross-section along the blade rotational axis A, FIG. 2b is a plain side view of the side S1, and FIG. 2c is a plain side view of the side S2.

As may be obtained from FIGS. 2a-c, the cylindrical generator housing 20 is closed on its second side face S2 and open on its first side face S1 so that the rotor 30b can be easily inserted into the rotor space 21 from the open side face S1 after the generator housing 20 has been mounted on the lower part 10a of the mainframe 10.

FIGS. 3a-c are different views showing another example of a cylindrical generator housing which may be used in the nacelle FIG. 1a, wherein FIG. 3a is a plain side view of the side S1, FIG. 3b is a vertical cross-section along the blade rotational axis A, and FIG. 3c is a plain side view of the side S2.

In the example shown in FIGS. 3a-c there are further components integrated in the wall of the cylindrical housing 20'. In particular, there is a cooling/heating means 100a, 100b which has corresponding connection openings in the second side face S2.

Moreover, there are integrated sensor means 101a, 101b for sensing the temperature of the cylindrical generator housing 20 which also have corresponding openings in the second side face S2.

Moreover, there is a maintenance opening 24 in the side face S2 of the cylindrical generator housing 20' which allows easy accessability of the generator components. With an open rear side construction, the generator can be very easily assembled/disassembled in parts, and this construction eases the technical maintenance of all integrated components in the housing.

FIGS. 4a,b are cross-sectional views for illustrating a mounting method of the nacelle of FIG. 1a,b.

With regard to FIG. 4a, in a first step the first bearing 70 is mounted on top of the tower 2.

Then, flange 60 is connected to the lower part 10a of the mainframe 10. Thereafter, the bearing 45 supported by the bearing housing 46 and the flange 40 are mounted on the lower part 10a of the mainframe 10. The preassembled parts 10a, 60, 45, 46, and 40 are lifted together and mounted on top of the tower 2.

In a following step, the gear drive means 80 for rotary motion of the nacelle 3 around the vertical axis B are installed in known manner which leads to the configuration shown in FIG. 4a.

In a next step, as illustrated in FIG. 4b, the rotor 30b is inserted into the rotor space 21 within generator housing 20 such that the rotor 30b extends into the rotor space 21 from the first side face S1 without contacting the stator 30a and being separated therefrom by air gap spacers 47 and being separated from the bottom of the cylindrical generator housing 20 by the gap 26. During the rotor 30b mounting the air gap spacers 47 in the air gap 25 (e.g. lumbers) serve to protect the stator 30a.

Then the cylindrical generator housing including inserted the rotor 30b is lifted onto the lower part 10a of the mainframe 10. In this example, the cylindrical surface of the generator housing 20 is form-closed with the cylindrical surface O1 of the lower part 10a of the mainframe, such that a self-alignment effect can be achieved.

Thereafter, the flange 40 is connected to the rotor 30b at its first end E1 by means of a nut/bolt connection or similar.

Finally, the air gap spacers 47 are removed and the upper part 10b of the mainframe 10 is mounted on top of the lower part 10a so as to embrace the bearing 45 and the generator housing 20 to establish a fully form-closed arrangement. The fixing of the two parts 10a, 10b of the mainframe 10 is then achieved by means of fixing bolts 13, 14 shown in FIG. 1b, and the hub 50 is then connected to the end E2 of the flange 40 by nuts/bolts or similar. Thus, the structure of FIG. 1a is obtained.

Further steps such as attaching the rotor blades and cable and piping connections will not be explained here since they are well known in the art.

Although the present invention has been described with reference to embodiments, it is not limited thereto, but can be modified in various manners which are obvious for a person skilled in the art. Thus, it is intended that the present invention is only limited by the scope of the claims attached herewith.

In particular, the present invention is not limited to the cylindrical geometry shown in the embodiments, but applicable for any geometry.

The invention claimed is:

1. A nacelle of a wind energy converter comprising:
   a main frame;
   a generator including a stator and a rotor;
   a generator housing attached to the main frame and at least partially enclosing the stator and a rotor space;
   a flange rotatably supported on the main frame and including a first end which is connected to the rotor;
   wherein the rotor extends into the rotor space without being supported in the generator housing.

2. The nacelle of claim 1, wherein the flange includes a second end which is connected to a hub for attaching rotor blades.

3. The nacelle of claim 1, wherein the generator housing includes a first side face, the first side face exposing the rotor space.

4. The nacelle of claim 3, wherein the generator housing includes a second side face opposite to the first side face, the second side face including at least one opening.

5. The nacelle of claim 1, wherein the main frame is form-closed with an outer surface of the generator housing.

6. The nacelle of claim 1, wherein the main frame includes a first part and a second part which are releasably connected with each other and which embrace the generator housing.

7. The nacelle of claim 1, wherein an air gap between the stator and the rotor is at least 1 cm.

8. The nacelle of claim 7, wherein the air gap between the stator and the rotor is between 1 cm and 5 cm.

9. The nacelle of claim 1, wherein at least one of the stator and the rotor includes a superconductor.

10. A mounting method of a nacelle of a wind energy converter comprising the steps of:
   mounting a first part of a main frame on a tower;
   mounting a rotatably supported flange which includes a first end on the first part of the main frame;
   providing a generator housing enclosing a stator and a rotor space;
   providing spacers in the rotor space;
   inserting a rotor into the rotor space such that the spacers are positioned between the rotor and the stator;
   mounting the generator housing including the inserted rotor on the first part of the main frame;
   connecting the first end of the flange to the rotor; and
   removing the spacers such that the rotor extends into the rotor space without being supported in the generator housing.

11. The method of claim 10, wherein a second part of the main frame is mounted such that the first and second parts embrace the generator housing.

12. The method of claim 10, wherein the flange includes a second end and further comprising the step of connecting the second end to a hub for attaching rotor blades.

13. The method of claim 10, wherein the step of mounting the flange includes mounting a bearing supported by a bearing housing on the first part of the main frame.

14. A generator in a wind energy converter, the generator comprising:
   a stator;
   a rotor; and
   a generator housing at least partially enclosing the stator and a rotor space;
   a main frame to which the generator housing is attached;
   a flange including a first end that is connected to the rotor;
   a single cylindrical bearing mounted to the main frame, the single cylindrical bearing supporting the flange;
   wherein the rotor extends into the rotor space without being supported in the generator housing.

15. The generator of claim 14, wherein the generator housing includes a first side face, the first side face exposing the rotor space, and wherein the rotor extends into the rotor space from the first side face without being supported in the generator housing.

16. The generator of claim 15, wherein the generator housing includes a second side face opposite to the first side face, the second side face including at least one opening.

17. The generator of claim 14, wherein an air gap between the stator and the rotor is at least 1 cm.

18. The generator of claim 14, wherein at least one of the stator and the rotor includes a superconductor.

19. The generator of claim 14, wherein a cooling system is provided in the generator housing.

20. The generator of claim 14, wherein a sensor is provided in the generator housing.

21. The generator of claim 14, wherein the flange includes a second end connected to a hub for attaching rotor blades and for forming a nacelle of a wind energy converter.

22. The generator of claim 14, wherein the flange has a Y-shaped cross-section in an axial direction.

* * * * *